United States Patent
Jat et al.

(10) Patent No.: US 11,146,974 B2
(45) Date of Patent: *Oct. 12, 2021

(54) OPTIMUM NETWORK PERFORMANCE IMPROVEMENT SOLUTIONS SELECTION SYSTEMS AND METHODS

(71) Applicant: T-Mobile USA, Inc., Bellevue, WA (US)

(72) Inventors: Khrum Kashan Jat, Sammamish, WA (US); Ahmed Mahdaoui, Bothell, WA (US); Spoorthy Kondapally, Issaquah, WA (US); Otto Fonseca Escudero, Snoqualmie, WA (US); Gary Dousson, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,594

(22) Filed: Dec. 30, 2019

(65) Prior Publication Data

US 2021/0037399 A1 Feb. 4, 2021

Related U.S. Application Data

(63) Continuation of application No. 16/529,702, filed on Aug. 1, 2019, now Pat. No. 10,555,191.

(51) Int. Cl.
*H04W 24/02* (2009.01)
*H04W 16/18* (2009.01)
*H04W 24/08* (2009.01)

(52) U.S. Cl.
CPC ........... *H04W 24/02* (2013.01); *H04W 16/18* (2013.01); *H04W 24/08* (2013.01)

(58) Field of Classification Search
CPC ..... H04W 24/02; H04W 16/18; H04W 24/08; H04W 24/04; H04W 16/22
See application file for complete search history.

(56) References Cited

U.S. PATENT DOCUMENTS

| 6,262,980 B1 | 7/2001 | Leung et al. |
| 6,526,010 B1 | 2/2003 | Morioka et al. |
| (Continued) | | |

FOREIGN PATENT DOCUMENTS

| KR | 20120089467 A | 8/2012 |
| KR | 20150021561 A | 3/2015 |
| KR | 20170076700 A | 7/2017 |

OTHER PUBLICATIONS

Ahas, R. et al. "Mobile Positioning in Space-Time Behaviour Studies: Social Positioning Method Experiments in Estonia" Cartography and Geographic Information Science vol. 34, No. 4, 2007, p. 259-273.

(Continued)

*Primary Examiner* — Chuong A Ngo
(74) *Attorney, Agent, or Firm* — Perkins Coie LLP

(57) ABSTRACT

Systems and methods for computing a standardized composite gain metric value for each solution that has been previously deployed to fix degradation issues at cell sites or other wireless nodes is disclosed. The method selects a set of Key Performance Indicators (KPIs), each of which is highly correlated to customer experience. For example, the method selects the following KPIs: traffic, numbers of users, Physical Resource Block (PRB) utilization, Channel Quality Indicator (CQI), throughput, and so on. The method then assigns a weight to each KPI, such that the weight reflects each KPI's relative importance and ensures that the KPIs are not double counted. For each solution deployed at a cell site, the method computes values of the following composite gain metrics: weighted gain and offload index. The method then (Continued)

can rank the solutions based on the computed composite gain metric values so that an optimum solution can be selected.

20 Claims, 20 Drawing Sheets

(56) References Cited

U.S. PATENT DOCUMENTS

| | | | |
|---|---|---|---|
| 6,891,694 B2 | 5/2005 | Hetzler et al. |
| 6,973,312 B1 | 12/2005 | Ngan et al. |
| 7,038,993 B2 | 5/2006 | Minamino et al. |
| 7,142,874 B1 | 11/2006 | Oleniczak |
| 7,343,375 B1 | 3/2008 | Dulac |
| 7,539,111 B2 | 5/2009 | Ishida et al. |
| 7,539,919 B2 | 5/2009 | Hwang et al. |
| 7,680,495 B2 | 3/2010 | Abed et al. |
| 7,710,841 B2 | 5/2010 | Hwang et al. |
| 7,739,578 B2 | 6/2010 | Hwang et al. |
| 7,813,952 B2 | 10/2010 | Eskandari |
| 7,823,042 B2 | 10/2010 | Hwang et al. |
| 7,849,027 B2 | 12/2010 | Koran et al. |
| 7,898,921 B2 | 3/2011 | Ishida et al. |
| 7,929,459 B2 | 4/2011 | Silva et al. |
| 7,941,148 B2 | 5/2011 | Roskowski et al. |
| 7,945,837 B2 | 5/2011 | Hwang et al. |
| 7,957,993 B2 | 6/2011 | Macgregor |
| 7,966,233 B1 | 6/2011 | Khowash et al. |
| 7,987,122 B2 | 7/2011 | Bevente et al. |
| 8,060,079 B1 | 11/2011 | Goyal et al. |
| 8,060,602 B2 | 11/2011 | Singh et al. |
| 8,073,119 B2 | 12/2011 | Bevente et al. |
| 8,199,901 B2 | 6/2012 | Rani et al. |
| 8,270,979 B1 | 9/2012 | Vargantwar |
| 8,332,256 B2 | 12/2012 | Dey et al. |
| 8,429,270 B2 | 4/2013 | Singh et al. |
| 8,522,108 B2 | 8/2013 | Hwang et al. |
| 8,526,320 B2 | 9/2013 | Puthenpura et al. |
| 8,538,379 B1 | 9/2013 | Jessen et al. |
| 8,572,464 B2 | 10/2013 | Hwang et al. |
| 8,665,835 B2 | 3/2014 | Hussein et al. |
| 8,676,799 B1 | 3/2014 | Vaver |
| 8,694,018 B2 | 4/2014 | Budic et al. |
| 8,782,045 B1 | 7/2014 | Vaver |
| 8,782,216 B2 | 7/2014 | Raghavendran et al. |
| 8,861,691 B1 | 10/2014 | De et al. |
| 8,891,746 B2 | 11/2014 | Stachiw et al. |
| 8,914,372 B2 | 12/2014 | Cao et al. |
| 8,918,108 B2 | 12/2014 | Arad et al. |
| 8,918,397 B2 | 12/2014 | Cao et al. |
| 8,954,791 B2 | 2/2015 | Kataria et al. |
| 8,966,055 B2 | 2/2015 | Mittal et al. |
| 9,031,561 B2 | 5/2015 | Nuss et al. |
| 9,047,226 B2 | 6/2015 | Thomas et al. |
| 9,113,365 B2 | 8/2015 | Tang et al. |
| 9,154,550 B1 | 10/2015 | Abgrall et al. |
| 9,204,319 B2 | 12/2015 | Ouyang et al. |
| 9,226,178 B2 | 12/2015 | Tarraf et al. |
| 9,253,334 B1 | 2/2016 | Rai et al. |
| 9,264,932 B2 | 2/2016 | Chen et al. |
| 9,332,458 B2 | 5/2016 | Nuss et al. |
| 9,411,653 B2 | 8/2016 | Trammel et al. |
| 9,413,890 B2 | 8/2016 | Mccormack et al. |
| 9,424,121 B2 | 8/2016 | Kushnir et al. |
| 9,430,944 B2 | 8/2016 | Grimm et al. |
| 9,439,081 B1 | 9/2016 | Knebl et al. |
| 9,456,362 B2 | 9/2016 | Flanagan et al. |
| 9,479,981 B2 | 10/2016 | Dimou et al. |
| 9,491,285 B2 | 11/2016 | Vaderna et al. |
| 9,503,919 B2 | 11/2016 | Sofuoglu et al. |
| 9,563,491 B2 | 2/2017 | Scouller et al. |
| 9,628,363 B2 | 4/2017 | Singh et al. |
| 9,674,374 B1 | 6/2017 | Bolton et al. |
| 9,706,438 B1 | 7/2017 | Kadmon et al. |
| 9,712,295 B2 | 7/2017 | Park et al. |
| 9,753,477 B2 | 9/2017 | Berka et al. |
| 9,826,412 B2 | 11/2017 | Henderson et al. |
| 9,826,420 B2 | 11/2017 | Tarraf et al. |
| 9,867,080 B2 | 1/2018 | Sung et al. |
| 9,892,026 B2 | 2/2018 | Isman et al. |
| 9,894,215 B1 | 2/2018 | Bolton et al. |
| 9,924,045 B1 | 3/2018 | Guha et al. |
| 10,039,013 B2 | 7/2018 | Periyasamy et al. |
| 10,044,878 B2 | 8/2018 | Guha et al. |
| 10,050,844 B2 | 8/2018 | Flanagan et al. |
| 10,079,735 B2 | 9/2018 | Martone et al. |
| 10,091,679 B1 | 10/2018 | Munar et al. |
| 10,231,147 B2 | 3/2019 | Sung et al. |
| 10,555,191 B1 | 2/2020 | Jat et al. |
| 2006/0064346 A1 | 3/2006 | Steenstra et al. |
| 2010/0041408 A1 | 2/2010 | Caire et al. |
| 2012/0190380 A1 | 7/2012 | Dupray et al. |
| 2012/0244898 A1 | 9/2012 | Guey et al. |
| 2013/0095872 A1 | 4/2013 | Sediq et al. |
| 2013/0229914 A1* | 9/2013 | Suerbaum ............ H04W 84/18 370/229 |
| 2014/0278035 A1 | 9/2014 | Nortrup |
| 2016/0381580 A1 | 12/2016 | Kwan |
| 2017/0243484 A1 | 8/2017 | Li et al. |
| 2017/0272319 A1 | 9/2017 | Sheen et al. |
| 2018/0006957 A1 | 1/2018 | Ouyang et al. |
| 2020/0076520 A1* | 3/2020 | Jana ................... H04B 17/3913 |

OTHER PUBLICATIONS

Bi, Suzhi et al. "Engineering Radio Maps for Wireless Resource Management" IEEE Wireless Communications, Apr. 2019, p. 133-141.

de Reuver, M. et al. "Designing viable business models for context-aware mobile services" Elsevier Telematics and Informatics 26 (2009) p. 240-248.

Lee, Seung-Cheol et al. "Efficient Mining of User Behaviors by Temporal Mobile Access Patterns" International Journal Computer Science and Network Security, vol. 7, No. 2, Feb. 2007, p. 285-291.

Ratti, C. et al. "Mobile Landscapes: using location data from cell phones for urban analysis" Environment and Planning B: Planning and Design 2006, vol. 33, p. 727-748.

Roth, John D. et al. "Efficient System Geolocation Architecture in Next-Generation Cellular Networks" IEEE Systems Journal, vol. 12, No. 4, Dec. 2018, p. 3414-3425.

Tseng, V.S. et al. "Mining Temporal Mobile Sequential Patterns in Location-Based Service Environments" IEEE International Conference 2007, 8 pages.

* cited by examiner

| KPI | Weights | Gain % | Weighted Gain | Index units | Offloaded Units | Offload Index |
|---|---|---|---|---|---|---|
| Traffic | 0.12 | 40% | 5% | 1Gb | 2.5Gb | 0.30 |
| Users | 0.20 | 30% | 6% | 1 user / 5 Mhz | 4 users / 5 Mhz | 0.81 |
| PRB Utilization | 0.22 | 40% | 9% | 1% | 3% | 0.01 |
| Throughput TMO | 0.21 | 15% | 3% | 1 Mbps | 2.3 Mbps | 0.48 |
| Throughput PCS | 0.14 | 30% | 4% | 2 Mbps | 3 Mbps | 0.42 |
| Total Weight | 100% | | 31% | | | 2.07 |

| | Factor loading | | | | | | Squared factor loading (scaled to unity sum) | | | | | |
|---|---|---|---|---|---|---|---|---|---|---|---|---|
| | PC1 | PC2 | PC3 | PC4 | PC5 | PC6 | PC1 | PC2 | PC3 | PC4 | PC5 | PC6 |
| TRAFFIC | 0.36 | 0.49 | 0.23 | (0.74) | 0.14 | (0.10) | 0.12 | 0.24 | 0.06 | 0.54 | 0.02 | 0.01 |
| Users | 0.46 | 0.06 | 0.38 | 0.53 | 0.54 | (0.27) | 0.20 | 0.05 | 0.14 | 0.28 | 0.29 | 0.07 |
| PRB | 0.51 | 0.11 | 0.12 | 0.19 | (0.35) | 0.74 | 0.22 | 0.01 | 0.01 | 0.04 | 0.13 | 0.55 |
| CQi | (0.09) | 0.81 | (0.41) | 0.35 | (0.15) | (0.15) | 0.11 | 0.65 | 0.17 | 0.12 | 0.02 | 0.02 |
| Throughput TMO | (0.49) | 0.23 | 0.12 | (0.01) | 0.60 | 0.58 | 0.21 | 0.05 | 0.02 | 0.00 | 0.36 | 0.33 |
| Throughput PCS | (0.38) | 0.20 | 0.78 | 0.12 | (0.43) | (0.12) | 0.14 | 0.04 | 0.60 | 0.02 | 0.18 | 0.02 |

| | PC1 | PC2 | PC3 | PC4 | PC5 | PC6 |
|---|---|---|---|---|---|---|
| Standard deviation | 1.76 | 1.09 | 0.85 | 0.69 | 0.57 | 0.42 |
| Proportion of Variance | 0.52 | 0.20 | 0.12 | 0.08 | 0.05 | 0.03 |
| Cumulative | 0.52 | 0.72 | 0.84 | 0.92 | 0.97 | 1.00 |

Weights:
| | |
|---|---|
| TRAFFIC | 0.12 |
| Users | 0.20 |
| PRB | 0.22 |
| CQi | 0.11 |
| Throughput TMO | 0.21 |
| Throughput PCS | 0.14 |

500

| SOLUTION | ON AIR DATE | MARKET | SECTOR | TARGET SECTOR | CHANNE BW |
|---|---|---|---|---|---|
| SMALL CELL | 2/28/2017 | Los Angeles | LA0046BA6 | LA03051D1 | 20 |

| Pre solution deployment 610a | | | | | | Post solution deployment 615a | | | | | |
|---|---|---|---|---|---|---|---|---|---|---|---|
| TRAFFIC GB | Users / 5Mhz | DL PRB % | CQI | Thpt TMO Mbps | Thpt M-PCS Mbps | TRAFFIC GB | Users / 5Mhz | DL PRB % | CQI | Thpt TMO Mbps | Thpt M-PCS Mbps |
| 1.4 | 23 | 84 | 8.35 | 3.7 | 1.6 | 1.2 | 16 | 61 | 9.22 | 7.8 | 5.1 |

605a → 600

Offload Index
625d

Capacity Gain
620d

70%

|  | Report Date | Vendor | Region | Market | Sector | TARGET SECTOR | Solution | On-Air Date |
|---|---|---|---|---|---|---|---|---|
| 605b | 3/6/2019 | ERICSSON | NORTHEAST | Philadelphia | 1 AT1063A2 | 1 AT1063A1 | L1900 | 12/4/2016 |
| 605c | 3/6/2019 | ERICSSON | NORTHEAST | Philadelphia | 1 AT1063A2 | 1 AT1063A1 | L1900 | 12/4/2016 |

Post Solution Deployment-14 days after

|  | Bandwidth (MHz) | Total Traffic (MB) | AVG Traffic (MB) | Users / 5 MHz | DL PRB Util (%) | CQI | QCi6 Thrpt (Kbps) | QCi7 Thrpt (Kbps) | NonGBR Thrpt (Kbps) | AVG VoLTE Calls (#) | Total VoLTE Calls (#) |
|---|---|---|---|---|---|---|---|---|---|---|---|
| 615b | 20.0 | 58,935.8 | 3,929.1 | 11.3 | 25.2 | 8.6 | 13,343.8 | 10,894.3 | 12,561.0 | 169.0 | 2,535.0 |
| 615c | 20.0 | 61,873.8 | 4,124.9 | 15.2 | 27.2 | 8.7 | 12,276.9 | 11,900.5 | 12,091.1 | 174.6 | 2,619.0 |

Pre Solution Deployment-14 days before

|  | Bandwidth (MHz) | Total Traffic (MB) | AVG Traffic (MB) | Users / 5 MHz | DL PRB Util (%) | CQI | QCi6 Thrpt (Kbps) | QCi7 Thrpt (Kbps) | NonGBR Thrpt (Kbps) | AVG VoLTE Calls (#) | Total VoLTE Calls (#) |
|---|---|---|---|---|---|---|---|---|---|---|---|
| 610b | 20 | 58,397 | 3,893.1 | 12.7 | 26.7 | 8.6 | 13,215.2 | 10,806.6 | 12,464.5 | 180.4 | 2,706.0 |
| 610c | 20 | 61,833 | 4,122.2 | 15.2 | 26.9 | 8.6 | 12,604.7 | 12,364.8 | 12,421.8 | 190.3 | 2,854.0 |

Gains

|  | Bandwidth (MHz) | Total Traffic (MB) | AVG Traffic (MB) | Users / 5 MHz | DL PRB Util (%) | CQI | QCi6 Thrpt (Kbps) | QCi7 Thrpt (Kbps) | NonGBR Thrpt (Kbps) | AVG VoLTE Calls (#) | Total VoLTE Calls (#) |
|---|---|---|---|---|---|---|---|---|---|---|---|
| 618a | 0.0% | 0.9% | 0.9% | -11.0% | -5.6% | 0.0% | 1.0% | 0.8% | 0.8% | -6.3% | -6.3% |
| 618b | 0.0% | 0.1% | 0.1% | 0.9% | 1.1% | 0.5% | -2.6% | -3.8% | -2.7% | -8.2% | -8.2% |

FIG. 6B

| SOLUTION | ON AIR DATE | SECTOR | TARGET SECTOR | CHANNE BW |
|---|---|---|---|---|
| Overlay | 1/8/2019 | B4DE3252A21 | L4DE3252A21 | 20 |

605d

| Pre solution deployment 610d | | | | | Post solution deployment 615d | | | | |
|---|---|---|---|---|---|---|---|---|---|
| TRAFFIC GB | Users / 5Mhz | DL PRB % | CQI | Thpt TMO Mbps | Thpt M-PCS Mbps | TRAFFIC GB | Users / 5Mhz | DL PRB % | CQI | Thpt TMO Mbps | Thpt M-PCS Mbps |
| 1.2 | 17 | 84 | 10 | 27 | 14 | 0.8 | 10 | 61 | 12 | 34 | 18 |

Offload Index
625d 8.49

Capacity Gain
620d

70%

| Solution | Capacity Gain (%) | Offload Index | Solutions count | % sectors with Gain > 0 |
|---|---|---|---|---|
| CELLSPLIT | 43 | 5.9 | 1K | 99% |
| SMALLCELL | 41 | 2.8 | 1.4K | 97% |
| L1900 | 29 | 3.1 | 65K | 95% |
| SECTORADD | 18 | 3.1 | 1.6K | 90% |
| L700 | 16 | 1.5 | 13K | 94% |
| All Solutions | 27 | 2.9 | 82K | 95% |

*FIG. 7*

OPTIMUM NETWORK PERFORMANCE IMPROVEMENT SOLUTIONS SELECTION SYSTEMS AND METHODS

CROSS-REFERENCES TO RELATED APPLICATIONS

This application is a continuation of U.S. patent application Ser. No. 16/529,702, filed on Aug. 1, 2019, and entitled "OPTIMUM NETWORK PERFORMANCE IMPROVEMENT SOLUTIONS SELECTION SYSTEMS AND METHODS," the disclosure of which is hereby incorporated herein in its entirety by reference.

BACKGROUND

When performance of a cell site in a telecommunications network degrades below a threshold value (for example, an LTE site gets congested), different solutions have been suggested to address and resolve the degradation issues. However, it is difficult for wireless telecommunication service providers to determine which solution would be effective, optimal and cost-effective for the degraded site. Further, it is also difficult for wireless telecommunication service providers to quantify the gain achieved when a particular solution is deployed.

BRIEF DESCRIPTION OF THE DRAWINGS

FIGS. 6A-8I are example reports and/or data structures used to select optimum network performance improvement solutions.

Figure 1:
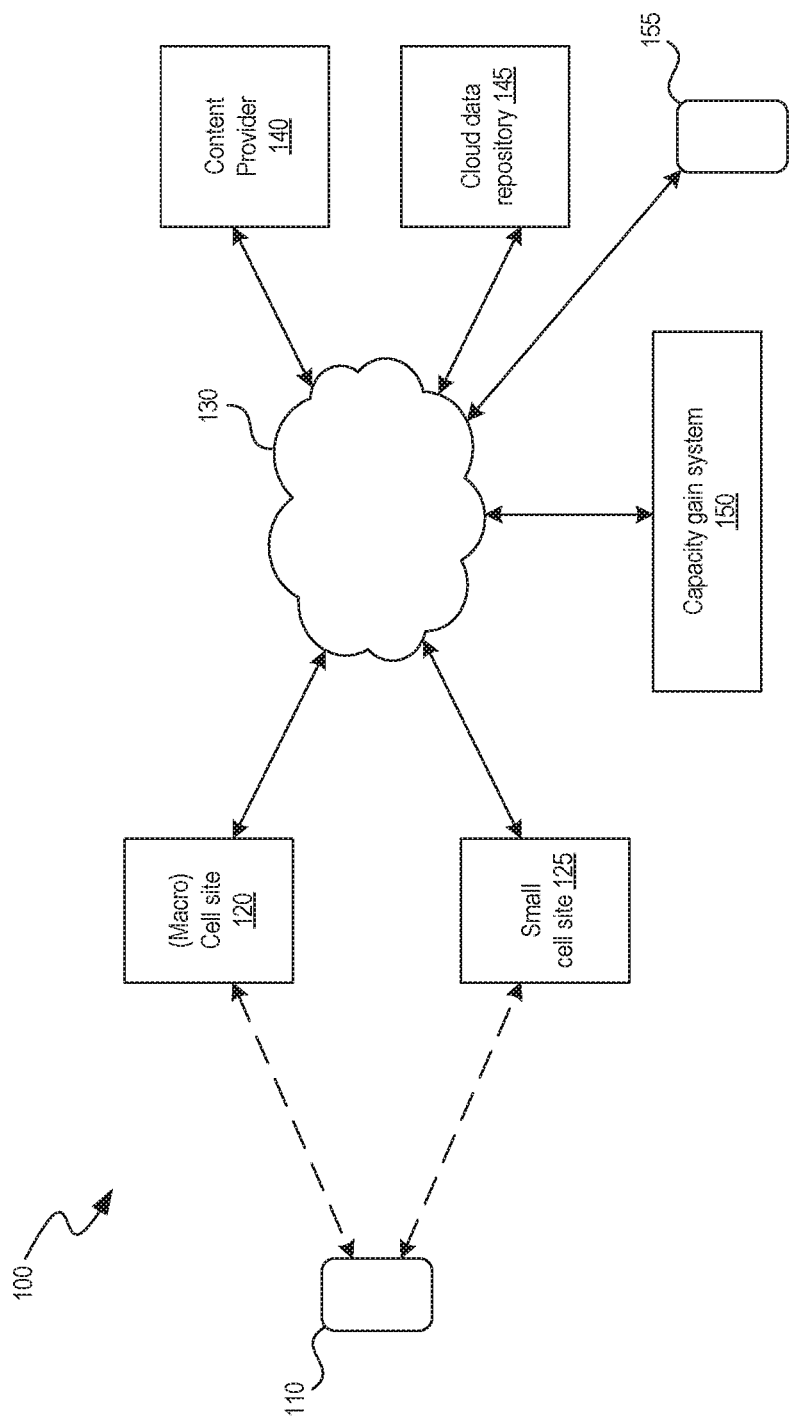
FIG. 1 is a block diagram illustrating a suitable computing environment within which to identify optimum network performance improvement solutions within a telecommunications network.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

To solve the above and other problems, the inventors have developed an optimum capacity composite gain system and related method to identify optimum network performance improvement solutions to improve telecommunications network performance based on computed capacity composite gain metrics ("capacity gain system"). One purpose of the capacity gain system is to summarize complex, multi-dimensional indicators to support decision making by wireless telecommunication service providers on changes that may be needed to infrastructure repair, modification, planning and development. The capacity gain system does this by reducing the visible size of a set of indicators without reducing the underlying information base.

The capacity gain system computes a standardized composite gain of metric values (e.g., weighted gain or offload index) for each solution that has been previously deployed to fix degradation issues at cell sites. To do so, the system first selects a set of Key Performance Indicators (KPIs), each of which is correlated to customer experience. For example, the system can select one or more of the following KPIs: traffic, number of users, Physical Resource Block (PRB) utilization, Channel Quality Indicator (CQI), throughput, and so on. The system then assigns a weight to each KPI, such that the weight reflects each KPI's relative importance and ensures that the KPIs are not double counted. That is, the weights are computed to minimize interdependencies between KPIs. For example, since the KPIs for traffic and users are highly correlated, the system assigns a lower weight to traffic (e.g., 0.12), and a higher relative weight to users (e.g., 0.20). For each solution deployed at a cell site, the system computes values of one or more of the following composite gain metrics: weighted gain and offload index. The weighted gain metric, which is discussed in more detail below, computes an overall weighted gain for each solution using weighted pre- and post-solution deployment measurements of key performance indicators. The offload index metric, which is also discussed in more detail below, computes and overall offload index for each solution based on offloaded units and pre- and post-solution deployment measurements of key performance indicators. The system then ranks the solutions based on the computed composite gain metric values so that an optimum solution can be selected. In several implementations, cost and duration factors can be incorporated into the above computation so that the system proposes a ranked list of optimum solutions based not just on the capacity gain that can be achieved, but also based on the cost to deploy a solution and an expected term of the solution.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram illustrating a suitable computing environment 100 within which to select optimum network performance improvement solutions within a telecommunications network.

One or more user devices 110, such as mobile devices or user equipment (UE) associated with users (such as mobile phones (e.g., smartphones), tablet computers, laptops, and so on), Internet of Things (IoT) devices, devices with sensors, and so on, receive and transmit data, stream content, and/or perform other communications or receive services over a telecommunications network 130, which is accessed by the user device 110 over one or more cell sites 120, 125. For example, the user device 110 can access a telecommunication network 130 via a cell site at a geographical location that includes the cell site, in order to transmit and receive data (e.g., stream or upload multimedia content) from various entities, such as a content provider 140, cloud data repository 145, and/or other user devices 155 on the network 130 and via the cell site 120.

The cell sites may include macro cell sites 120, such as base stations, small cell sites 125, such as picocells, microcells, or femtocells, and/or other network access component or sites (including IEEE 802.11 WLAN access points). The cell cites 120, 125 can store data associated with their operations, including data associated with the number and types of connected users, data associated with the provision and/or utilization of a spectrum, radio band, frequency channel, and so on, provided by the cell sites 120, 125, and so on. The cell sites 120, 125 can monitor their use, such as the provisioning or utilization of PRBs provided by a cell site physical layer in LTE network. For example, a cell site 120 having a channel bandwidth of 5 MHz that provides 25 available physical resource blocks through which data can be transmitted to/from the user device 110.

Other components provided by the telecommunications network 130 can monitor and/or measure the operations and transmission characteristics of the cell sites 120, 125 and other network access components. For example, the telecommunications network 130 can provide a network monitoring system, via a network resource controller (NRC) or network performance and monitoring controller, or other network control component, in order to measure and/or obtain the data associated with the utilization of cell sites 120, 125 when data is transmitted within a telecommunications network.

The computing environment 100 includes a capacity gain system 150 configured to monitor aspects of the network 130 based on, for example, data received from the network monitoring system. The capacity gain system 150 can measure values for various metrics (including, for example, key performance metrics) at cell sites (e.g., cell sites 120 and 125) to evaluate and select optimum network performance improvement solutions to be deployed at cell sites to improve their performance as described in detail below.

FIG. 1 and the discussion herein provide a brief, general description of a suitable computing environment 100 in which the capacity gain system 150 can be supported and implemented. Although not required, aspects of the capacity gain system 150 are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through any communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative implementation, the mobile device or portable device can represent the server portion, while the server can represent the client portion.

In some implementations, the user device 110 and/or the cell sites 120, 125 can include network communication components that enable the devices to communicate with remote servers or other portable electronic devices by transmitting and receiving wireless signals using a licensed, semi-licensed, or unlicensed spectrum over communications network, such as network 130. In some cases, the communication network 130 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network 130 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Figure 2:
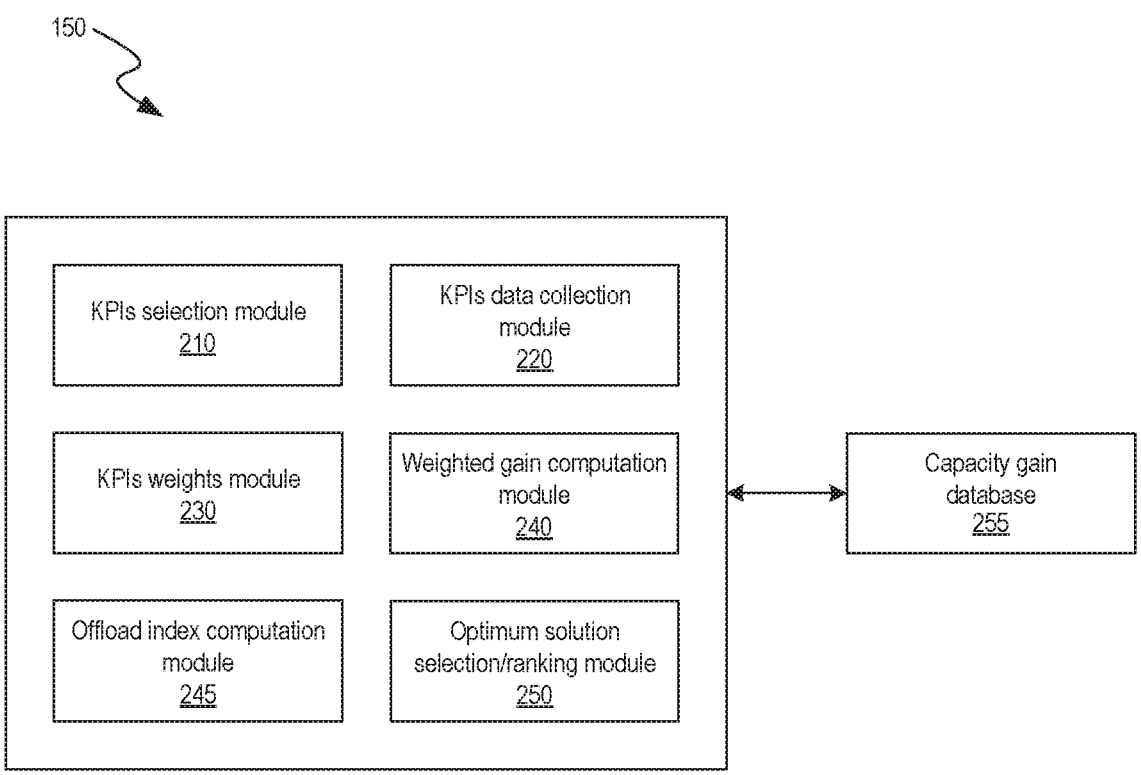
FIG. 2 is a block diagram illustrating the components of the optimum capacity composite gain system.

Further details regarding the operation and implementation of the capacity gain system 150 will now be described.
Examples of Identifying Optimum Network Performance Improvement Solutions FIG. 2 is a block diagram illustrating the components of the capacity gain system 150. The capacity gain system 150 can include functional modules that are implemented with a combination of software (e.g., executable instructions, or computer code) and hardware (e.g., at least a memory and processor). Accordingly, as used herein, in some examples a module is a processor-implemented module or set of code, and represents a computing device having a processor that is at least temporarily configured and/or programmed by executable instructions stored in memory to perform one or more of the specific functions described herein. For example, the capacity gain system 150 can include a KPIs selection module 210, a KPIs data collection module 220, a KPIs weights module 230, a weighted gain computation module 240, an offload index computation module 245, and an optimum solution ranking and selection module 250, each of which is discussed separately below.

The KPIs Selection Module

The KPIs selection module 210 is configured and/or programmed to select a subset of KPIs from a set of Performance Indicators (PIs). The set of PIs comprises hundreds (for example 200-300) of performance indicators, each of which can be used to measure an aspect of performance of a specific cell site. For example, the set of PIs can include some or all of the following performance indicators: traffic, number of users, PRB utilization, CQI, throughput, carrier aggregation, advanced Quadrature Amplitude Modulation (QAM), cost of deploying a network performance improvement solution, cost of maintaining the network performance improvement solution, expected lifetime of the network performance improvement solution, duration of deploying the network performance improvement solution, lifetime of the network performance improvement solution, efficacy of the network performance improvement solution, location of the telecommunications network site, lease information of the telecommunications network site, duration of deployment of the network performance improvement solution, entitlements and permits required to deploy the network performance improvement solution, tower height, nearest available site, population served by the telecommunications network site, households served by the telecommunications network site, rent cost associated with the network performance improvement solution, backhaul availability, and so on.

From this set of numerous performance indicators, the KPIs selection module 210 selects a subset of key performance indicators to be used to evaluate and compare impact/performance of various network performance improvement solutions. The KPIs selection module 210 selects the subset of key performance indicators based on one or more of the following factors: correlation of each key performance indicator with customer experience, correlation of each key performance indicator with other key performance indicators, user (for example, administrator) preference, telecommunications service provider preference, and so on. For instance, the KPIs selection module 210 selects performance indicators which exhibit a low degree of correlation yet reflect the dimensions of the overall composite. For example, the KPIs selection module 210 selects the following key performance indicators as components of the subset of key performance indicators: traffic, number of users, PRB utilization, CQI, and throughput. Alternatively or additionally, the KPIs selection module 210 selects a top threshold number of performance indicators having a maximum correlation with the customer experience. In some implementations, the KPIs selection module 210 selects components of the subset of key performance indicators based on principal component analysis.

The KPIs Data Collection Module

Figure 6A:
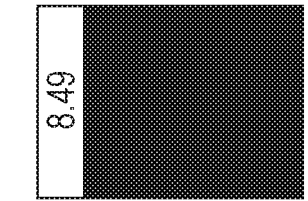
Figure 6A:
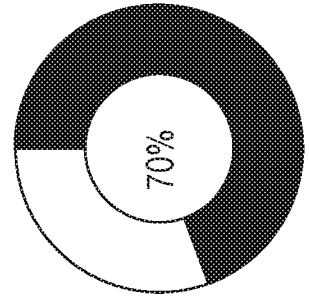
Figure 6C:
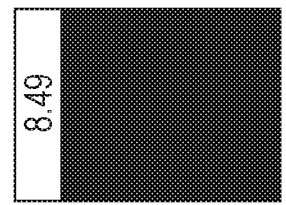
Figure 6C:
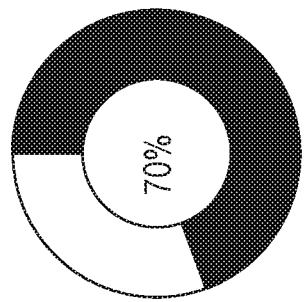

The KPIs data collection module 220 is configured and/or programmed to receive data from one or more sources regarding values of the performance indicators in the subset of key performance indicators and/or the set of performance indicators. The KPIs data collection module 220 can collect the values of the performance indicators before a particular network performance improvement solution is deployed (pre-solution deployment), after the particular network performance improvement solution is deployed (post-solution deployment), or both. For example, the KPIs data collection module 220 receives data for the pre-solution deployment 610a-d and post-solution deployment 615a-615d (FIGS. 6A, 6B, and 6C).

The KPIs data collection module 220 collects/receives/accesses one or more of the following data records associated with the performance indicators (which can be stored in the capacity gain database 255): location specific records (LSR), call data records (CDRs), timing advance values, RF signal data, distance between the customer and at least one telecommunications network site, strength of signal, quantity of data used, type of device of the customer, applications data (e.g., application type, name, owner, manager, data sent/received/used/saved, bandwidth used, APIs accessed, etc.), source of usage records (for example, telecommunications service provider, third-party, application owner, etc.). Examples of other types of data collected by the KPIs data collection module 220 include, but are not limited to, data collected from third party applications (e.g., including crowdsourced data) that can help to determine customer experience with location. For example, the KPIs data collection module 220 can collect information of a user's location using his/her social media posts (e.g., tweets, check-ins, posts, etc.). As another example, the KPIs data collection module 220 collects application level data (e.g., collected using applications related to Internet of Things (IoT) devices, sensors, billing meters, traffic lights, etc.) to identify the user location and/or data related to the performance indicators.

The KPIs Weights Module

Figure 4:
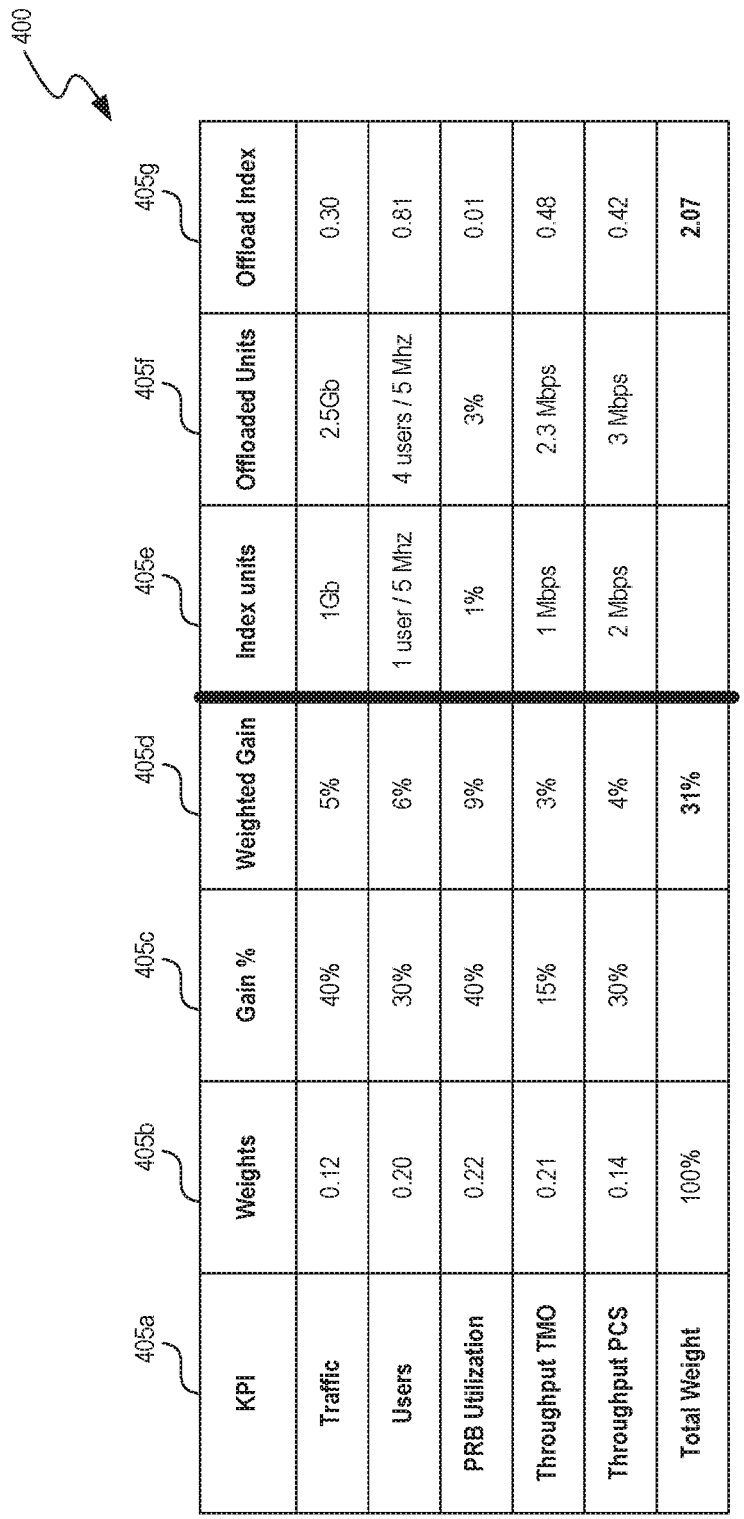
FIG. 4 is an example data structure to store information about various key performance indicators and their metrics.
Figure 5:
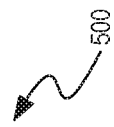
FIG. 5 is example data structures to compute weights of various key performance indicators.

The KPIs weights module 230 is configured and/or programmed to compute weights for the key performance indicators in the subset of key performance indicators. The KPIs weights module 230 computes the weights that reflect the relative importance of the key performance indicators and/or minimize interdependence of key performance indicators in the subset of key performance indicators (for example, to avoid double counting). The KPIs weights module 230 can compute the weights based on principal component analysis. For example, as illustrated in FIG. 5, the capacity gain system 150 utilizes principal component analysis techniques 500 to select and compute weights for the following KPIs: traffic, users, PRB, CQI, and throughput. FIG. 4 also illustrates weights 405b computed by the KPIs weights module 230 for a subset of KPIs 405a. In FIGS. 4 and 5, reference to Throughput TMO and Throughput PCS refers to data throughput for two different services provided over network nodes or elements, which can be used for comparison purposes.

The Weighted Gain Computation Module

The weighted gain computation module 240 is configured and/or programmed to compute weighted gain measurements for network performance improvement solutions. To compute the weighted gain measurements for a network performance improvement solution, the weighted gain computation module 240 uses values for performance indicators (for example, the KPIs selected by the KPIs selection module 210). For example, to compute the weighted gain measurements for a network performance improvement solution, the weighted gain computation module 240 accesses values (for example, from the capacity gain database 255) for one or more KPIs measured before the network performance improvement solution was deployed at a site (pre-solution deployment) and after the network performance improvement solution was deployed at the site (post-solution deployment). For example, as illustrated in FIGS. 6A, 6B, and 6C, the weighted gain computation module 240 accesses pre-solution deployment values 610a-610d and post-solution deployment values 615a-615d for the following subset of KPIs: traffic, users, download PRB, CQI, and throughput. The weighted gain computation module 240 can select pre- and post-solution deployment values within a particular time window. For example, the weighted gain computation module 240 selects pre- and post-solution deployment values within a 14-day pre- and post-window (14 days before the solution deployment and 14 days after the solution deployment). The time window can be pre-configured by an administrator or dynamically determined based on one or more of the following factors: the type of solution deployed, location of the site, attributes of the site (for example, busyness, etc.), cost of the solution, sources of data, density of data, and so on.

After retrieving the pre- and post-solution deployment values for the subset of KPIs, the weighted gain computation module 240 computes a percentage of gain (gain %) for each KPI. For example, as illustrated in FIG. 6B, the weighted gain computation module 240 computes, for each KPI, gains 618a and 618b and for each of the two solutions 605b and 605c respectively that are deployed in a particular market and sector, using the following formula:

$$\text{Gain \%}_{KPI} = \left|\frac{\text{post solution deployment}_{KPI} - \text{pre solution deployment}_{KPI}}{\text{pre solution deployment}_{KPI}}\right| * 100$$

FIG. 4 also illustrates gains 405c computed for a subset of KPIs 405b. After computing the gains for each KPI, the weighted gain computation module 240 computes a weighted gain for each KPI based on the weights computed for each KPI by the KPIs weights module 230. For example, as illustrated in FIG. 4, the weighted gain computation module 240 computes weighted gain 405d for each KPI using the following formula:

$$\text{Weighted Gain}_{KPI} = \text{weight}_{KPI} * \text{Gain \%}_{KPI}$$

After computing the weighted gains for each KPI, the weighted gain computation module 240 computes an overall weighted gain value for the network performance improvement solution (capacity gain). For example, as illustrated in FIG. 4, the weighted gain computation module 240 computes the capacity gain for a network performance improvement solution using the following formula:

$$\text{Capacity Gain}_{solution} = \Sigma \text{Weighted Gain}_{KPIs}$$

FIGS. 6A and 6C similarly illustrate capacity gains 620a and 620d that are computed by the weighted gain computation module 240 for solutions 605a and 605d respectively.

The Offload Index Computation Module

The offload index computation module 245 is configured and/or programmed to compute offload index measurements for network performance improvement solutions. The offload index computation module 245 selects an index unit value for each key performance indicator. The index unit value can represent a minimum (for example, least) amount of significant gain to be measured. For example, FIG. 4 illustrates index units 405e selected by the offload index computation module 245. Further, to compute the offload index measurements for network performance improvement solutions, the offload index computation module 245 uses values for performance indicators (for example, the KPIs selected by the KPIs selection module 210). For example, to compute the offload index measurements for a network performance improvement solution, the offload index computation module 245 accesses values (for example, from the capacity gain database 255) for one or more KPIs measured before the network performance improvement solution was deployed at a site (pre-solution deployment) and after the network performance improvement solution was deployed at the site (post-solution deployment). For example, as illustrated in FIGS. 6A, 6B, and 6C, the offload index computation module 245 accesses pre solution deployment values 610a-610d and post-solution deployment values 615a-615d for the following subset of KPIs: traffic, users, download PRB, CQI, and throughput. The offload index computation module 245 can select pre- and post-solution deployment values within a particular time window. For example, the offload index computation module 245 selects pre- and post-solution deployment values within a 14-day pre- and post-window (14 days before the solution deployment and 14 days after the solution deployment). The time window can be pre-configured by an administrator r dynamically determined based on one or more of the following factors: the type of solution deployed, location of the site, attributed of the site (for example, busyness, etc.), cost of the solution, sources of data, density of data, and so on.

After retrieving the pre- and post-solution deployment values for the subset of KPIs, the offload index computation module 245 computes an offloaded units metric value for each KPI. For example, as illustrated in FIG. 4, the offload index computation module 245 computes, for each KPI, offloaded units values 405f using the following formula:

$$\text{Off loaded Unit}_{KPI} = \text{post solution deployment}_{KPI} - \text{pre solution deployment}_{KPI}$$

After computing the offloaded units values for each KPI, the offload index computation module 245 computes an offload index value for each KPI based on the weights computed for each KPI by the KPIs weights module 230, the selected index units, and the computed offloaded units. For example, as illustrated in FIG. 4, the offload index computation module 245 computes offload index value 405g for each KPI using the following formula:

$$\text{Offload Index}_{KPI} = \text{weight}_{KPI} * \frac{\text{Offloaded Unit}_{KPI}}{\text{Index Unit}_{KPI}}$$

After computing the offload index value for each KPI, the offload index computation module 245 computes an overall offload index value for the network performance improvement solution. For example, as illustrated in FIG. 4, the offload index computation module 245 computes the offload index for a network performance improvement solution using the following formula:

$$\text{Offload Index}_{solution} = \Sigma \text{Offload Index}_{KPIs}$$

FIGS. 6A and 6C similarly illustrate offload indices 625a and 625d that are computed by the offload index computation module 245 for solutions 605a and 605d respectively.

The Optimum Solution Ranking and Selection Module

The optimum solution ranking and selection module 250 is configured and/or programmed to select one (or more) network performance improvement solutions to deploy at particular sites. Examples of network performance improvement solutions include, but are not limited to cell split, small cell deployment, spectrum addition, spectrum removal, sector addition, sector removal, and so on. The optimum solution ranking and selection module 250 evaluates the capacity gains and/or offload indices computed for various network performance improvement solutions to rank the solutions and then select one or more solutions as candidates for deployment at a site (for example, region-market-sector). FIG. 7 illustrates various solutions 705*a* and their associated capacity gain 705*b* and offload index 705*c* values. The solutions 705*a* are ranked in the order of decreasing capacity gain values. In some implementations, the optimum solution ranking and selection module 250 selects the top most performing solution (for example, small cell). As illustrated in FIG. 7, the following information can also be stored/displayed about the network performance improvement solutions: solutions count (total number of sites/sectors where the solution is deployed) 705*d* and percentage of sites/sectors where the gain was greater than a threshold value (for example, zero) 705*e*.

In addition to evaluating the capacity gains and/or offload indices of solutions, the optimum solution ranking and selection module 250 can consider one or more of the following additional factors when ranking and/or selecting optimum solutions: location of the telecommunications network site, lease information of the telecommunications network site, duration of deployment of the network performance improvement solution, entitlements and permits required to deploy the network performance improvement solution, tower height, nearest available site, population served by the telecommunications network site, households served by the telecommunications network site, rent cost associated with the network performance improvement solution, backhaul availability, cost and duration factors (e.g., cost of deploying a network performance improvement solution, cost of maintaining the network performance improvement solution, expected lifetime of the network performance improvement solution, duration of deploying the network performance improvement solution, lifetime of the network performance improvement solution), similarity between the site where a solution was deployed and the site where the solution is to be deployed, solutions deployed at sites in a selected geographic area, and so on. For example, while the optimum solution ranking and selection module 250 initially selects a small cell solution as an optimum solution based on the computed capacity gains and/or offload indices, it can update its selection to a sector add solution based on the costs and duration of deployment associated with the various solutions (small cell solutions tend to be more expensive and take a longer time to deploy, as compared to sector add solutions).

Flow Diagrams

Figure 3A:
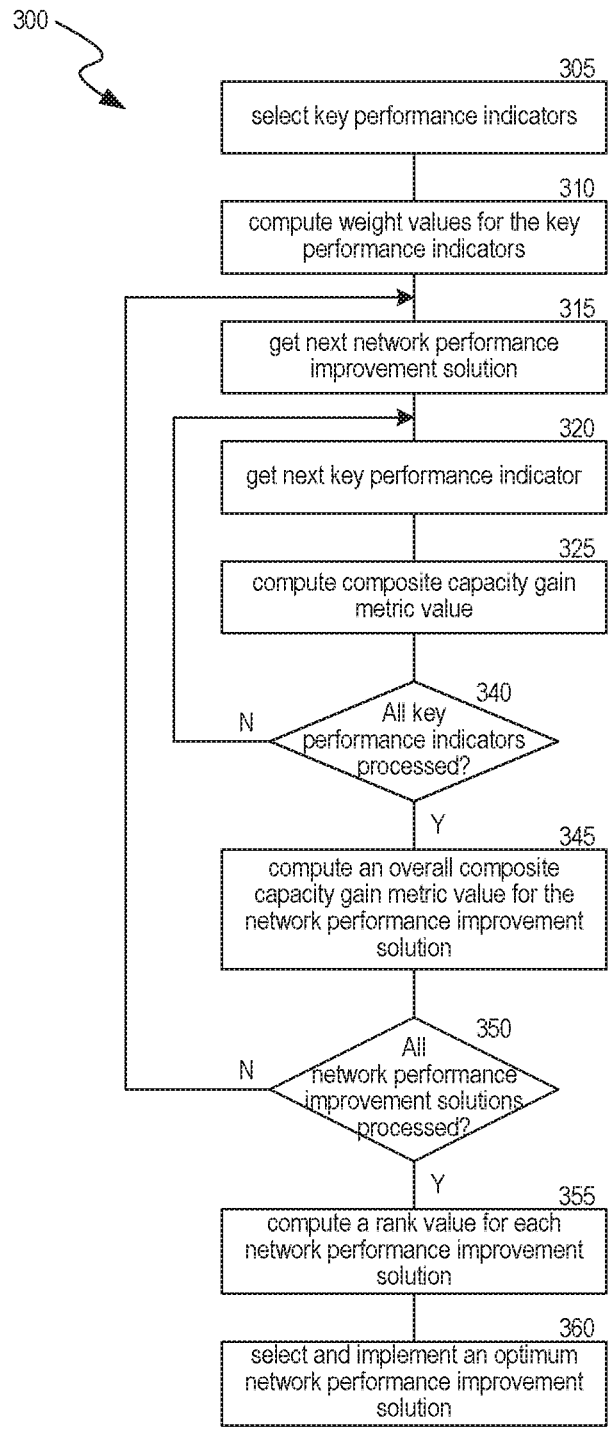
FIGS. 3A-3C are flow diagrams illustrating processes of identifying optimum network performance improvement solutions in a telecommunications network.
Figure 3B:
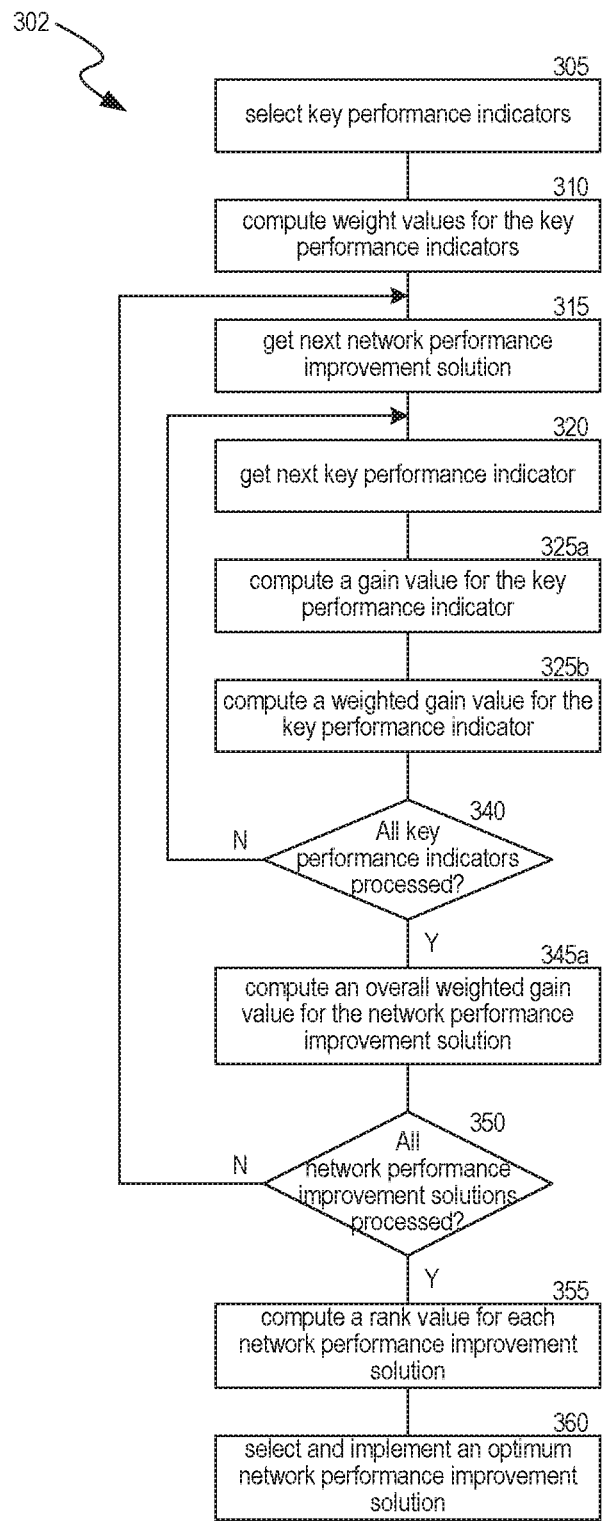
Figure 3C:
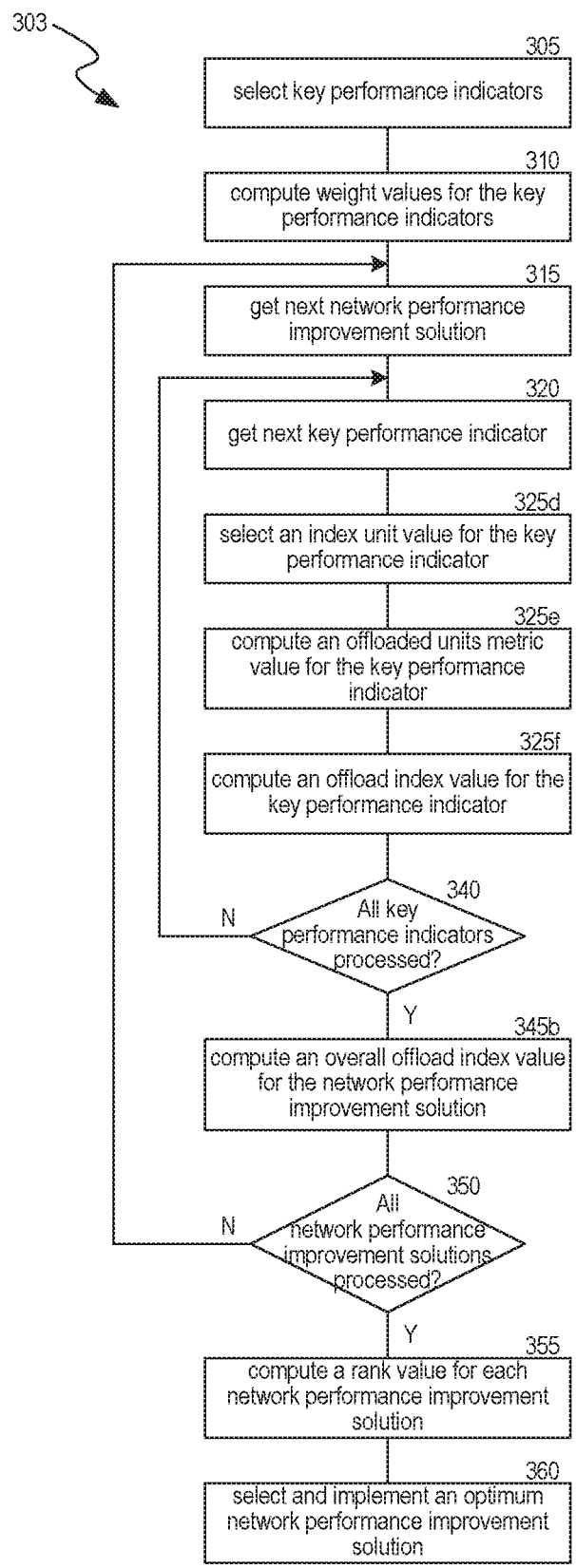

FIGS. 3A-3C are flow diagrams illustrating processes of identifying optimum network performance improvement solutions in a telecommunications network. FIG. 3A illustrates a process 300 of identifying optimum network performance improvement solutions to be deployed at cell sites in a telecommunications service network. Process 300 begins at block 305 where a capacity gain system selects key performance indicators. For example, as discussed above, a capacity gain system selects a subset of key performance indicators from a set of performance indicators based on a correlation of each performance indicator with customer experience. At block 310, the capacity gain system computes a weight for each key performance indicator in the subset of key performance indicators. Then, for each network performance improvement solution in a set of network performance improvement solutions (block 315) and for each key performance indicator in the subset of key performance indicators (block 320), the capacity gain system computes a composite capacity gain metric value. Examples of composite capacity gain metric values include, but are not limited to gain value, weighted gain value, offloaded units metric value, offload index value, and so on. After computing the composite capacity gain metric value for each KPI, at blocks 340-345, the capacity gain system computes an overall composite capacity gain metric value for the network performance improvement solution using the computed composite capacity gain metric values for the KPIs in the subset of key performance indicators. The capacity gain system repeats blocks 315-350 for each network performance improvement solution. Then, at block 355, the capacity gain system computes ranks for the network performance improvement solutions in the set of network performance improvement solutions based on the computed composite capacity gain metric values for each network performance improvement solution. At block 360, the capacity gain system selects an optimum network performance improvement solution to be implemented at at least one telecommunications network site based on the rankings and/or one or more of the additional factors discussed above in reference to the optimum solution ranking and selection module 250.

FIG. 3B illustrates a process 302 of identifying optimum network performance improvement solutions to be deployed at cell sites in a telecommunications service network using the weighted gain metric. Blocks 305-320 of process 302 are similar to blocks 305-320 of process 300 discussed above. At block 325*a* of process 302, the capacity gain system computes a gain percentage value for each KPI based on a difference between the KPI value before the network performance improvement solution was deployed at a telecommunications network site and the KPI value after the network performance improvement solution was deployed at the telecommunications network site. At block 325*b*, the capacity gain system computes a weighted gain value for the KPI based on the computed gain percentage value for the KPI and the computed weight for the KPI. Then, at block 345*a*, the capacity gain system computes an overall weighted gain value for the network performance improvement solution using the computed weighted gain values for the KPIs in the subset of KPIs. Blocks 350-360 of process 302 are similar to blocks 350-360 of process 300 discussed above.

FIG. 3C illustrates a process 303 of identifying optimum network performance improvement solutions to be deployed at cell sites in a telecommunications service network using the weighted gain metric. Blocks 305-320 of process 303 are similar to blocks 305-320 of process 300 discussed above. At block 325*d* of process 303, the capacity gain system selects an associated index unit value. At block 325*e*, the capacity gain system computes an offloaded units metric value for each KPI based on a difference between a KPI value before the network performance improvement solution was deployed at the telecommunications network site and a KPI value after the network performance improvement solution was deployed at the telecommunications network site. At block 325*f*, the capacity gain system computes an offload index value for the KPI based on the computed offloaded units metric value for the KPI, the selected index unit value associated with the KPI, and the computed weight for the KPI. At block 345b, the capacity gain system computes an overall offload index value for the network performance improvement solution using the computed offload index values for the key KPIs in the subset of KPIs. Blocks 350-360 of process 303 are similar to blocks 350-360 of process 300 discussed above.

Figure 8A:
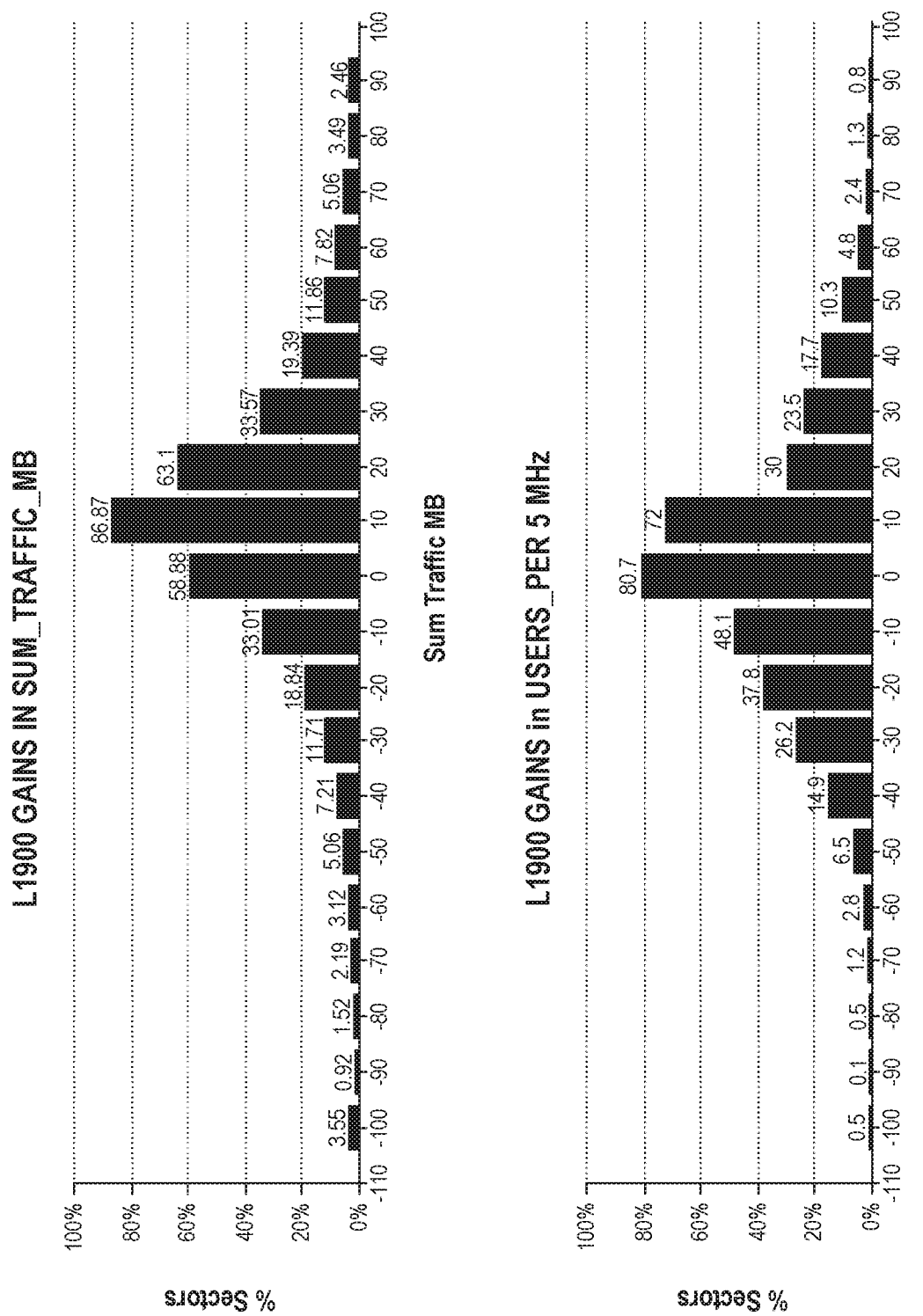
Figure 8B:
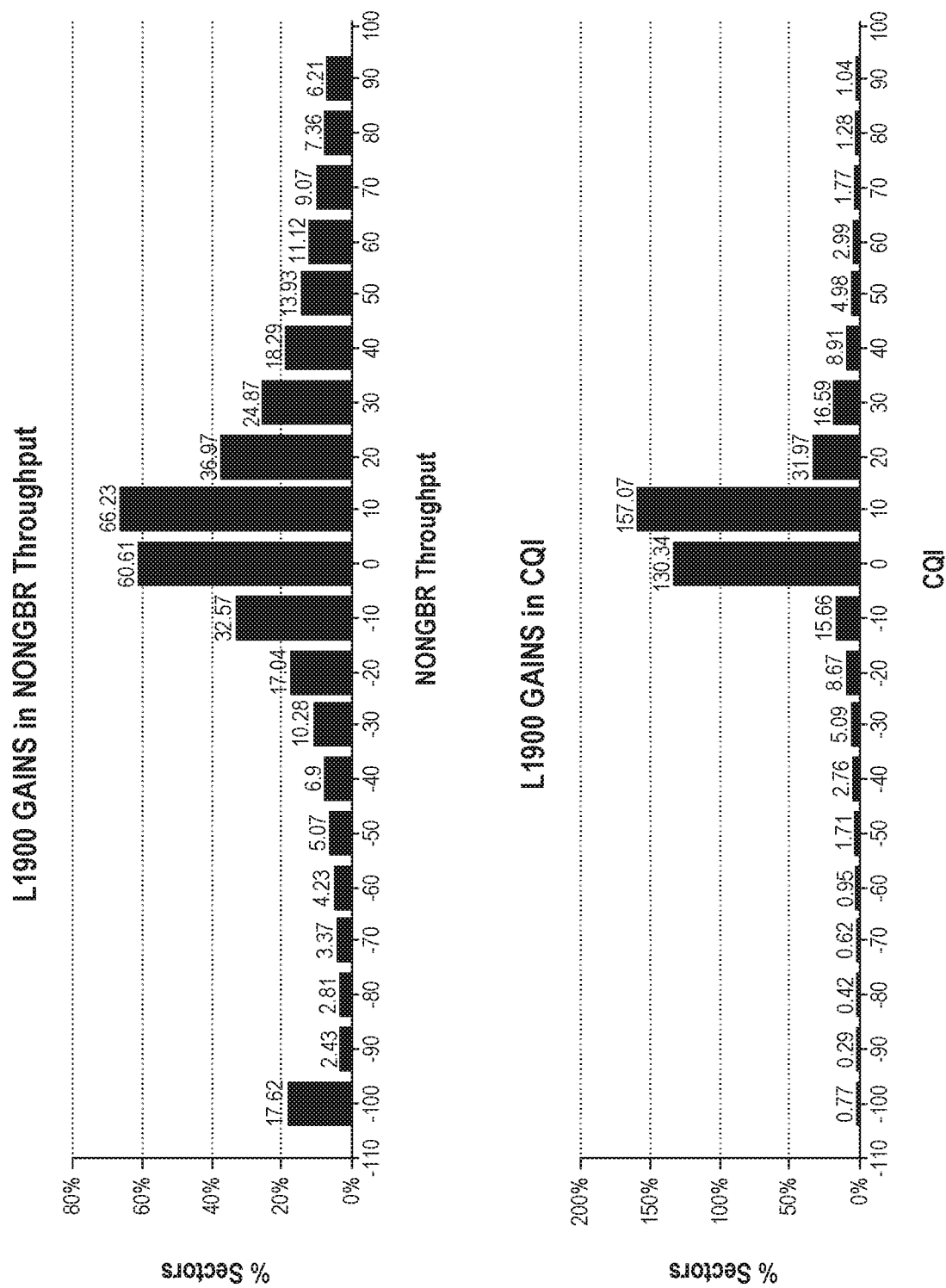
Figure 8C:
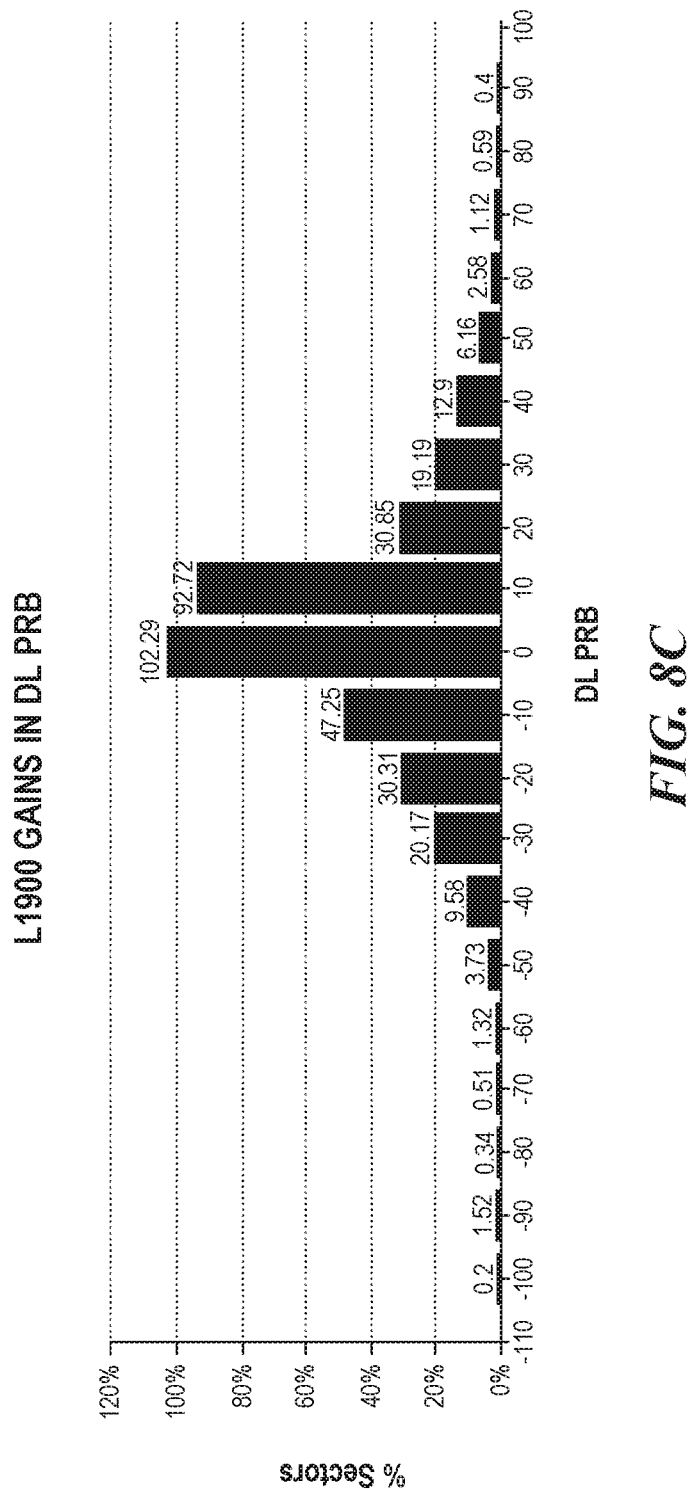
Figure 8D:
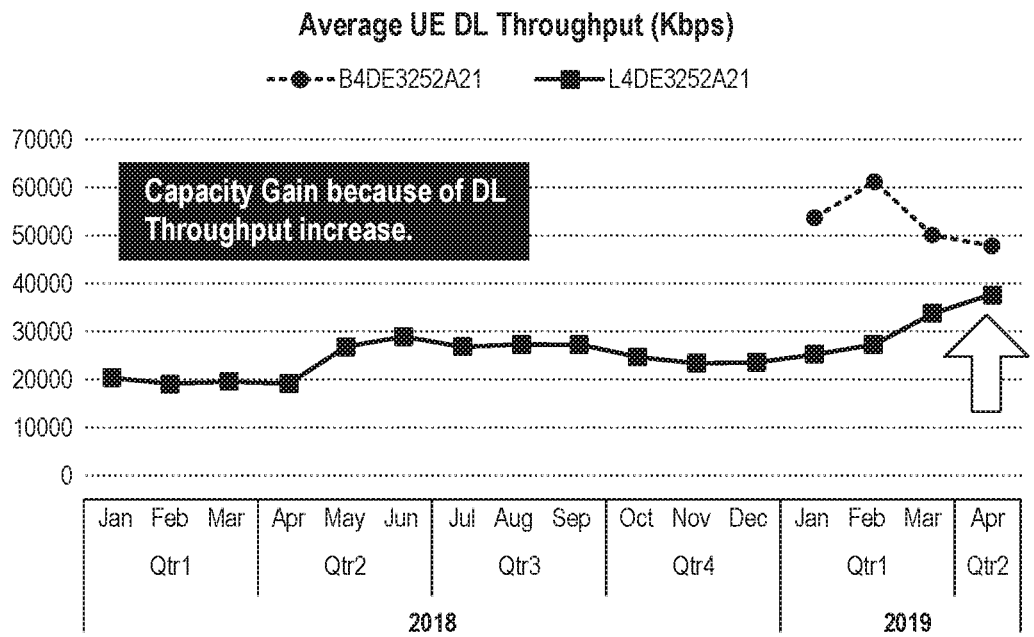
Figure 8D:
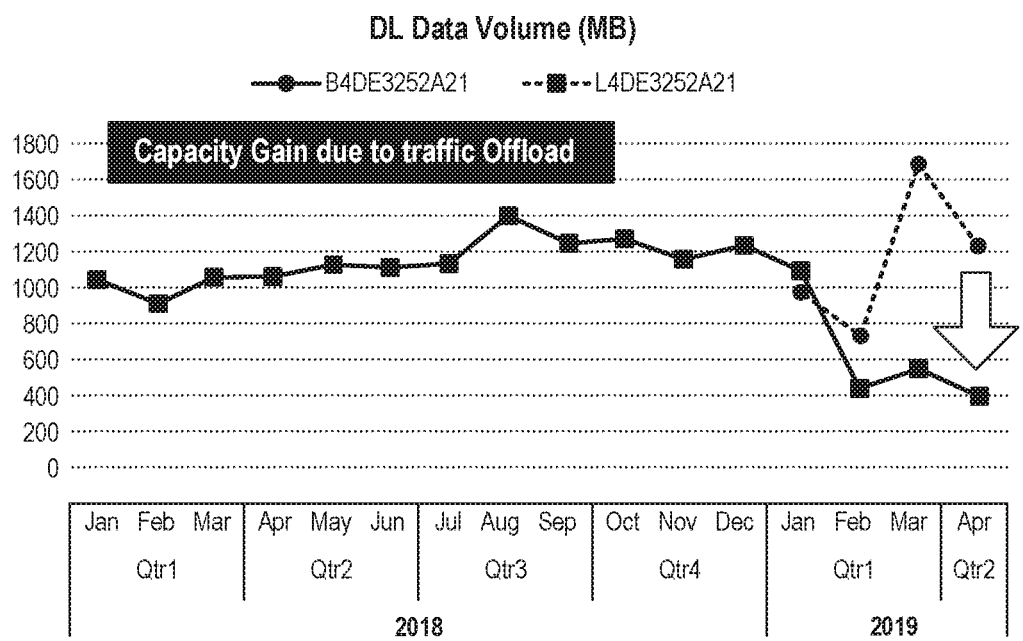
Figure 8E:
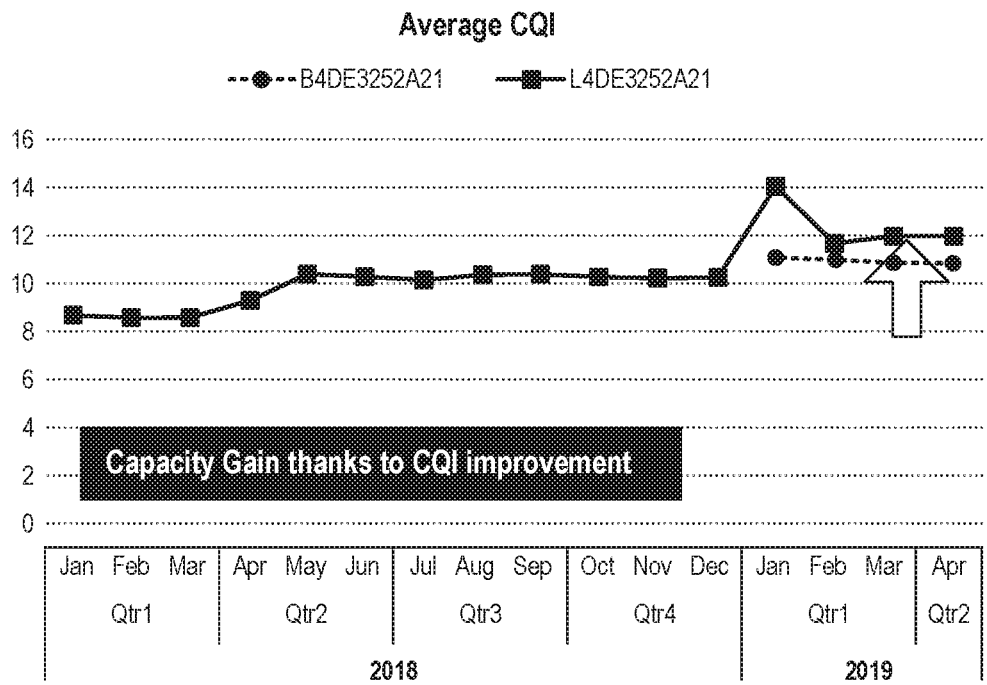
Figure 8E:
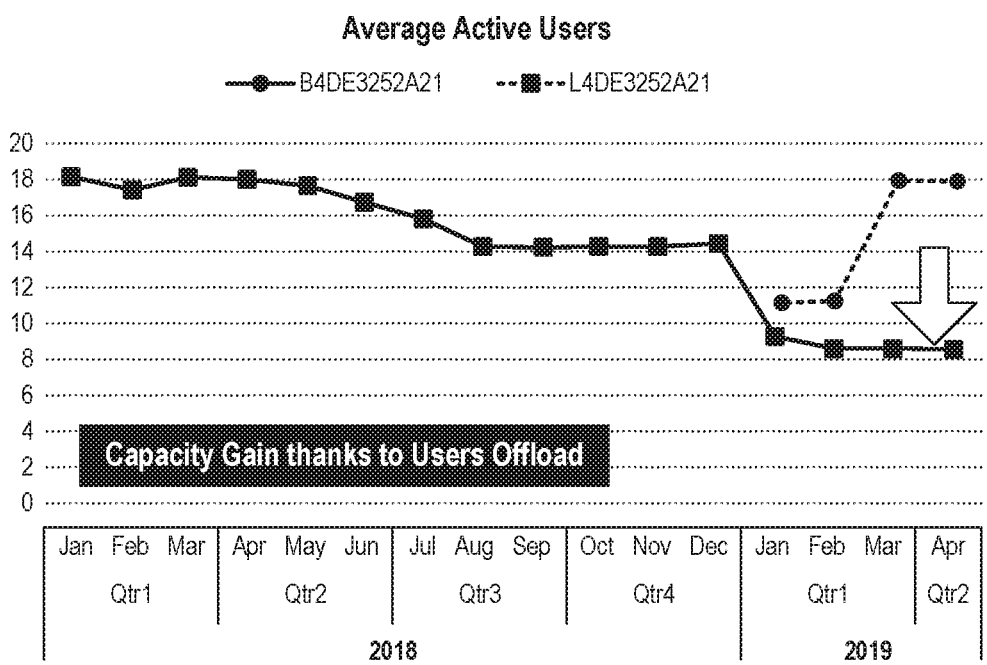
Figure 8F:
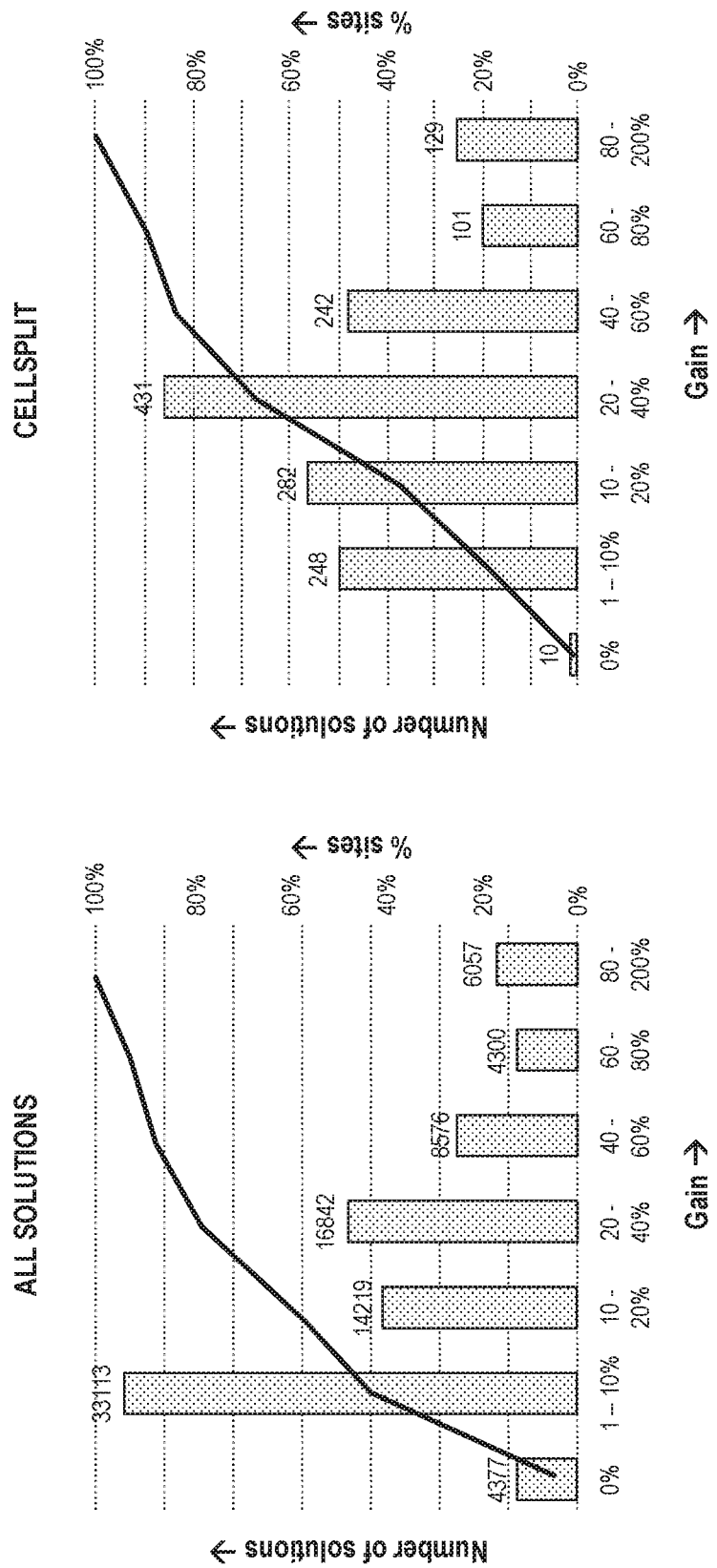
Figure 8G:
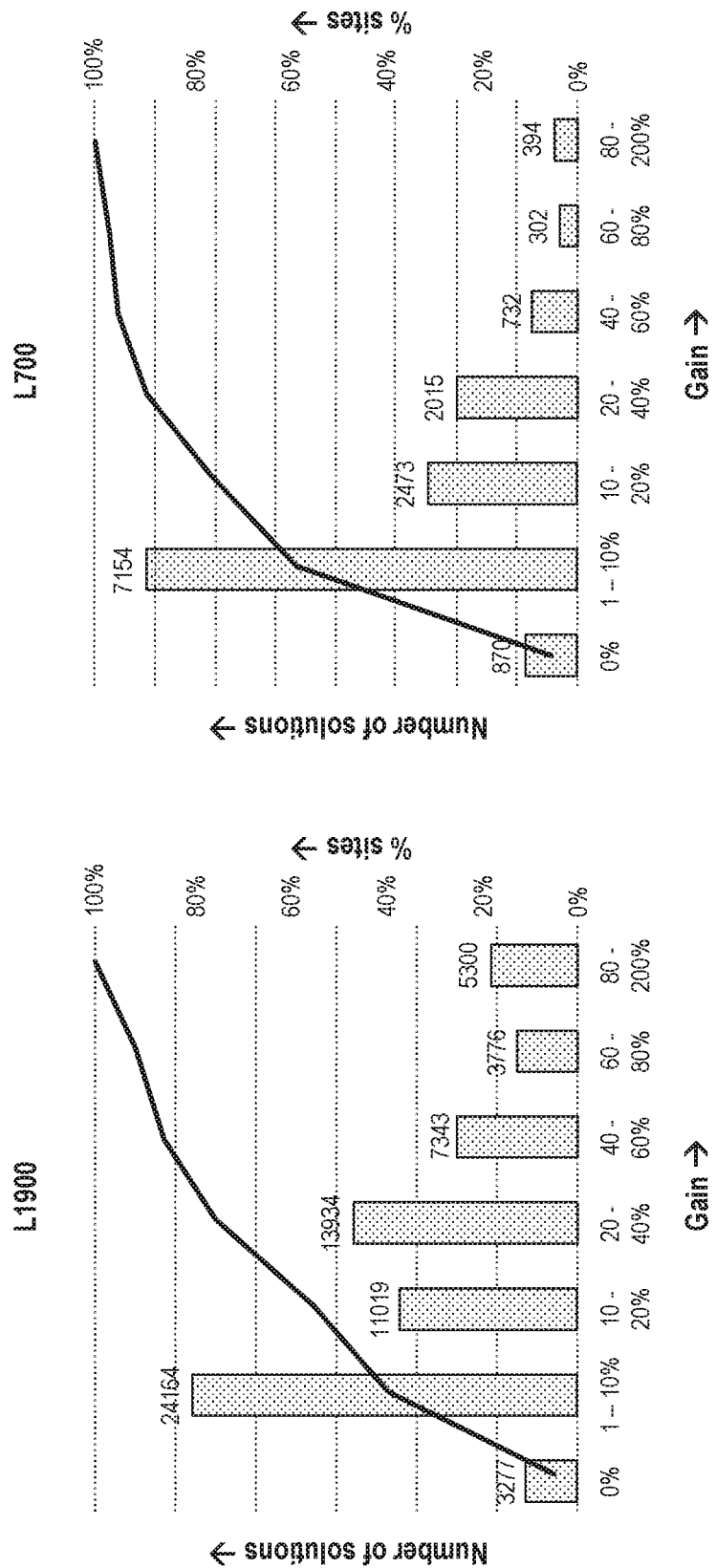
Figure 8H:
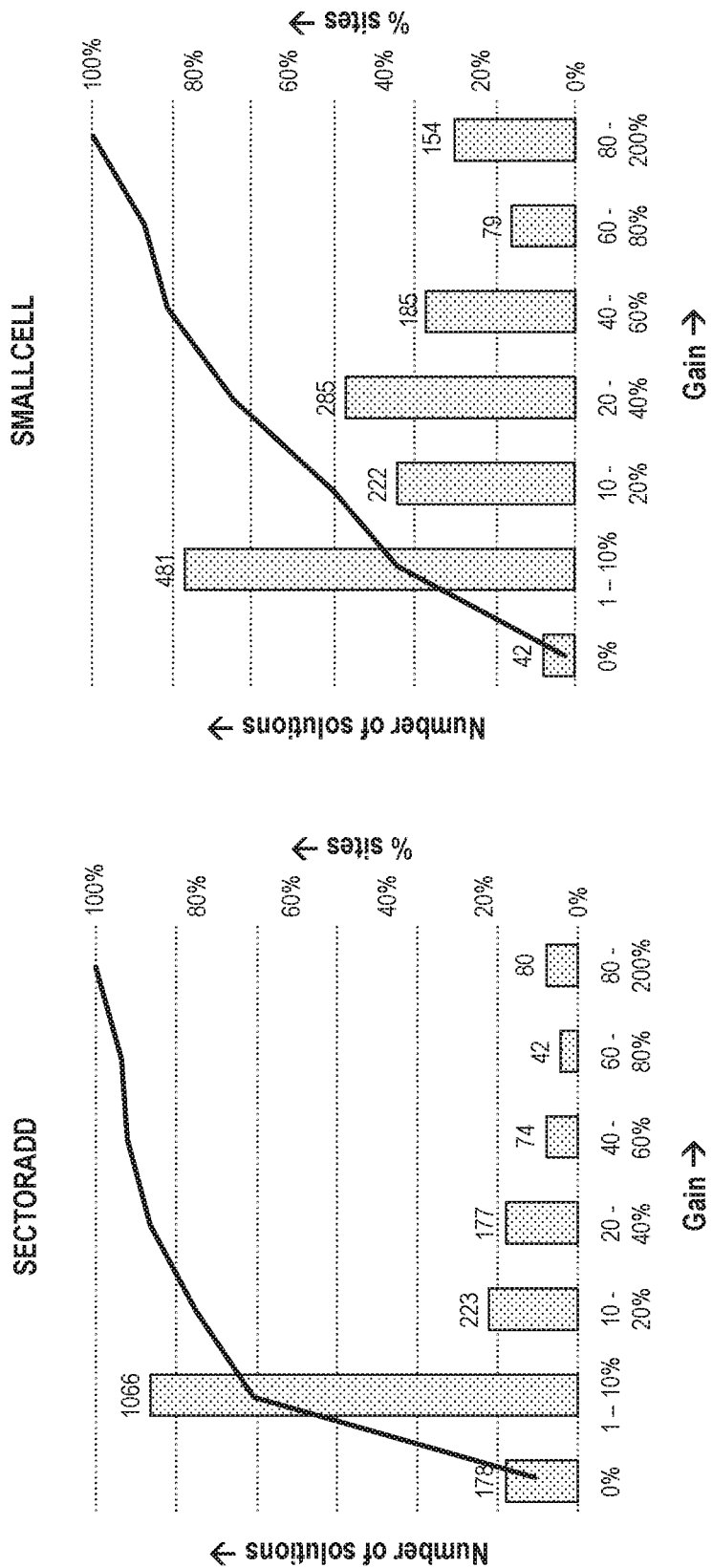
Figure 8I:
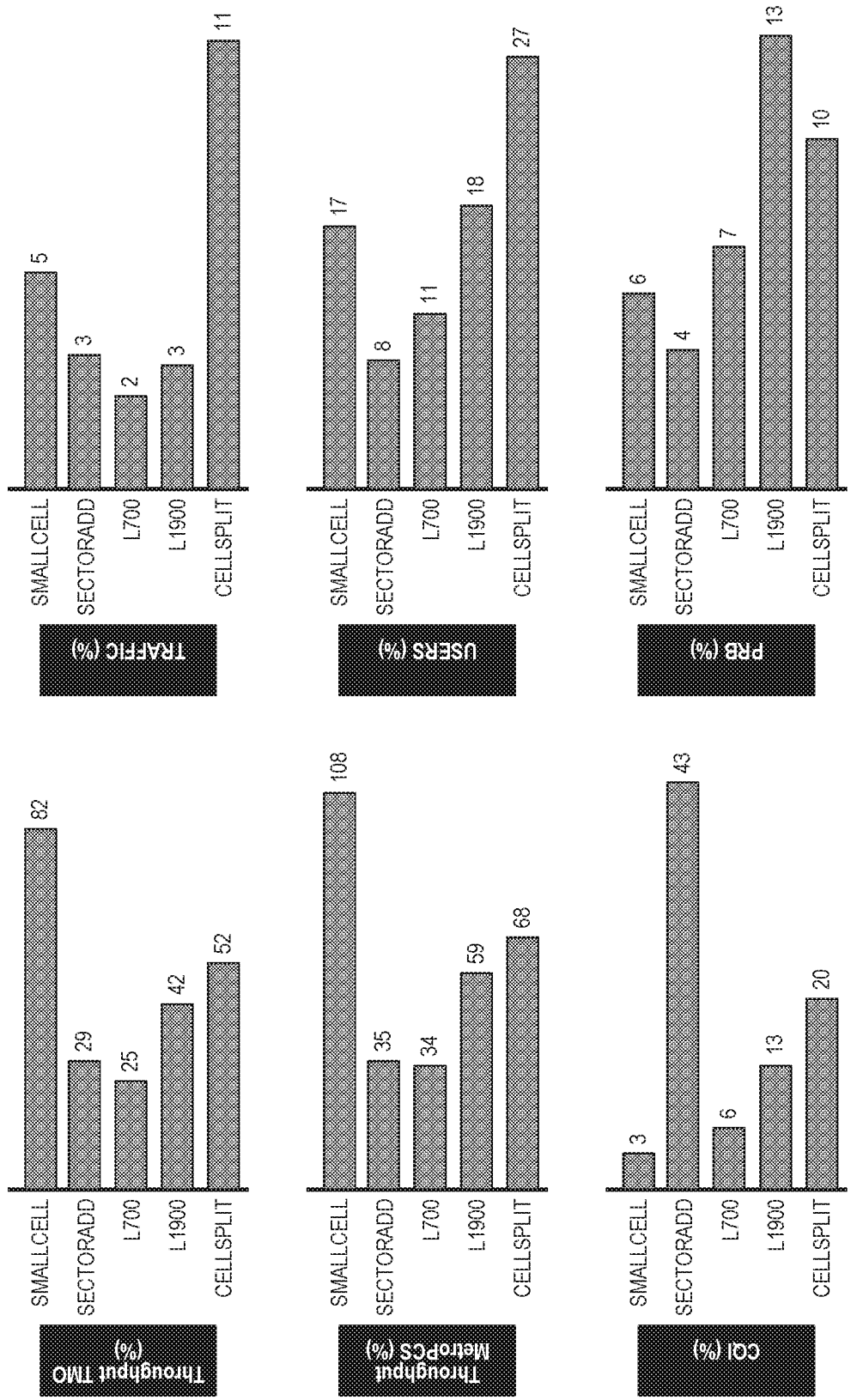

FIGS. 8A-8I are example reports displayed to a user to illustrate various metrics associated with various network performance improvement solutions. FIG. 8A-E illustrate reports that chart gains achieved by network performance improvement solutions (for example, adding a spectrum (L1900)) for several KPIs, including traffic, users, throughput, CQI, PRB utilization, data volume, and so on. FIGS. 8F-H illustrate reports that chart overall gains achieved by multiple network performance improvement solutions, such as spectrum add (L1900 and L700), sector add, cell split, small cell, and all solutions. FIG. 8I illustrates reports that chart individual KPI gains achieved by multiple network performance improvement solutions.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations can perform routines having blocks, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects can likewise be implemented in a computer-readable medium. Accordingly, the inventors reserve the right to add additional claims after filing the application to pursue such additional claim forms for other aspects of the technology.

The invention claimed is:

1. At least one non-transitory computer-readable medium, excluding transitory signals and containing instructions, that when executed by a processor, performs operations for identifying network performance improvement solutions to be deployed at nodes in a telecommunications service network, the operations comprising:

for at least one network performance improvement solution in a set of network performance improvement solutions:

for at least one key performance indicator associated with the at least one network performance improvement solution:

computing a gain percentage value based on a difference between a key performance indicator value before the network performance improvement solution was deployed at a telecommunications network site, and a key performance indicator value after the network performance improvement solution was deployed at the telecommunications network site;

computing a weighted gain value for the key performance indicator based on the computed gain percentage value for the key performance indicator; and automatically generating a weighted gain value for the network performance improvement solution using the computed weighted gain value for the at least one key performance indicator associated with the at least one network performance improvement solution;

prioritizing network performance improvement solutions in the set of network performance improvement solutions using the automatically generated weighted gain values for the network performance improvement solutions; and automatically identifying an optimum network performance improvement solution to be implemented at at least one node in the telecommunications service network based on the prioritized network performance improvement solutions.

2. The at least one non-transitory computer-readable medium of claim 1, wherein the at least one key performance indictor is selected from a group comprising:
traffic,
number of users,
Physical Resource Block (PRB) utilization,
Channel Quality Indicator (CQI),
throughput,
carrier aggregation,
advanced Quadrature Amplitude Modulation (QAM),
cost of deploying a network performance improvement solution,
cost of maintaining the network performance improvement solution,
expected lifetime of the network performance improvement solution,
duration of deploying the network performance improvement solution,
lifetime of the network performance improvement solution,
efficacy of the network performance improvement solution, or
any combination thereof.

3. The at least one non-transitory computer-readable medium of claim 1, wherein the optimum network performance improvement solution is further identified based on one or more of the following:
location of the at least one node,
lease information of the at least one node,
duration of deployment of the network performance improvement solution,
entitlements and permits required to deploy the network performance improvement solution,
tower height,
nearest available node,
population served by the at least one node,
households served by the at least one node,
rent cost associated with the network performance improvement solution,
backhaul availability,
or any combination thereof.

4. The at least one non-transitory computer-readable medium of claim 1, wherein the operations further comprise:
automatically identifying the at least one key performance indicator from a set of performance indicators based on a correlation of each performance indicator with customer experience.

5. The at least one non-transitory computer-readable medium of claim 1, wherein the weighted gain values for the at least one key performance indicator associated with the at least one network performance improvement solution is generated by:
automatically generating the gain percentage value for the at least one key performance indicator reflecting a gain achieved by deploying the at least one network performance improvement solution at the at least one node; and
automatically generating the weighted gain percentage value for the at least one key performance indicator using the automatically generated gain percentage value and reflecting a relative importance of the at least one key performance indicator among other key performance indicators associated with the at least one network performance improvement solution.

6. The at least one non-transitory computer-readable medium of claim 1, wherein the operations further comprise:
automatically generating a weight for the at least one key performance indicator reflecting a relative importance of the at least one key performance indicator among other key performance indicators associated with the at least one network performance improvement solution.

7. The at least one non-transitory computer-readable medium of claim 1, wherein the set of network performance improvement solutions comprises:
cell split,
small cell deployment,
spectrum addition,
spectrum removal,
sector addition,
sector removal, or
any combination thereof.

8. At least one non-transitory computer-readable medium, excluding transitory signals and containing instructions, that when executed by a processor, performs operations for identifying network performance improvement solutions to be deployed at nodes in a telecommunications service network, the operations comprising:
for at least one network performance improvement solution in a set of network performance improvement solutions:
for at least one key performance indicator associated with the at least one network performance improvement solution:
computing an offloaded units metric value based on a difference between a key performance indicator value before the network performance improvement solution was deployed at the telecommunications network site and a key performance indicator value after the network performance improvement solution was deployed at the telecommunications network site; and
computing an offload index value for the key performance indicator based on the computed offloaded units metric value for the key performance indicator; and
automatically generating an offload index value for the network performance improvement solution using the computed offload index values for the at least one key performance indicator associated with the at least one network performance improvement solution;
prioritizing network performance improvement solutions in the set of network performance improvement solutions using the automatically generated offlod index values for each network performance improvement solution; and automatically identifying an optimum network performance improvement solution to be implemented at at least one node in the telecommunications service network based on the prioritized network performance improvement solutions.

9. The at least one non-transitory computer-readable medium of claim 8, wherein the at least one key performance indicator is selected from a group comprising:
traffic,
number of users,
Physical Resource Block (PRB) utilization,
Channel Quality Indicator (CQI),
throughput,
carrier aggregation,
advanced Quadrature Amplitude Modulation (QAM),
cost of deploying a network performance improvement solution,
cost of maintaining the network performance improvement solution,
expected lifetime of the network performance improvement solution,
duration of deploying the network performance improvement solution,
lifetime of the network performance improvement solution,
efficacy of the network performance improvement solution, or
any combination thereof.

10. The at least one non-transitory computer-readable medium of claim 8, wherein the optimum network performance improvement solution is further identified based on one or more of the following:
location of the telecommunications network site,
lease information of the telecommunications network site,
duration of deployment of the network performance improvement solution,
entitlements and permits required to deploy the network performance improvement solution,
tower height,
nearest available site,
population served by the telecommunications network site,
households served by the telecommunications network site,
rent cost associated with the network performance improvement solution,
backhaul availability,
or any combination thereof.

11. The at least one non-transitory computer-readable medium of claim 8, wherein the operations further comprise:
automatically identifying the at least one key performance indicator from a set of performance indicators based on a correlation of each performance indicator with customer experience.

12. The at least one non-transitory computer-readable medium of claim 8, wherein the offload index value for the at least one key performance indicator associated with the at least one network performance improvement solution is generated by:
automatically generating the offloaded units metric value for the for the at least one key performance indicator reflecting a gain achieved by deploying the at least one network performance improvement solution at the at least one node; and automatically generating the offload index value for the at least one key performance indicator using the automatically generated offloaded units metric value for the key performance indicator and an index unit value associated with the at least one key performance indicator, and reflecting a relative importance of the at least one key performance indicator among other key performance indicators associated with the at least one network performance improvement solution.

13. The at least one non-transitory computer-readable medium of claim 8, wherein the operations further comprise:
automatically generating a weight for the at least one key performance indicator reflecting a relative importance of the at least one key performance indicator among other key performance indicators associated with the at least one network performance improvement solution.

14. The at least one non-transitory computer-readable medium of claim 8, wherein the set of network performance improvement solutions comprises:
cell split,
small cell deployment,
spectrum addition,
spectrum removal,
sector addition,
sector removal, or
any combination thereof.

15. The at least one non-transitory computer-readable medium of claim 8, wherein the operations further comprise selecting an associated index unit value for a particular key performance indicator to indicate a least significant gain to be measured for the particular key performance indicator.

16. A computer-implemented method for identifying network performance improvement solutions to be deployed at nodes in a telecommunications service network, the method comprising:
for at least one network performance improvement solution in a set of multiple network performance improvement solutions:
for at least one key performance indicator associated with the at least one network performance improvement solution:
computing a gain percentage value based on a difference between a key performance indicator value before the network performance improvement solution was deployed at a telecommunications network site, and a key performance indicator value after the network performance improvement solution was deployed at the telecommunications network site;
computing a weighted gain value for the key performance indicator based on the computed gain percentage value for the key performance indicator; and
automatically generating a weighted gain value for the network performance improvement solution using the computed weighted gain values for the at least one key performance indicator associated with the at least one network performance improvement solution;
prioritizing network performance improvement solutions in the set of network performance improvement solutions based on the automatically generated weight gain values for the network performance improvement solutions; and
automatically identifying an optimum network performance improvement solution to be implemented at at least one node in the telecommunications service network based on the prioritized network performance improvement solutions.

17. The method of claim 16, wherein the at least one key performance indicator is selected from a group comprising:
traffic,
number of users,
Physical Resource Block (PRB) utilization,
Channel Quality Indicator (CQI),
throughput,
carrier aggregation,
advanced Quadrature Amplitude Modulation (QAM),
cost of deploying a network performance improvement solution,
cost of maintaining the network performance improvement solution,
expected lifetime of the network performance improvement solution,
duration of deploying the network performance improvement solution,
lifetime of the network performance improvement solution,
efficacy of the network performance improvement solution, or
any combination thereof.

18. The method of claim 16, wherein the optimum network performance improvement solution is further identified based on one or more of the following:
location of the telecommunications network site,
lease information of the telecommunications network site,
duration of deployment of the network performance improvement solution,
entitlements and permits required to deploy the network performance improvement solution,
tower height,
nearest available site,
population served by the telecommunications network site,
households served by the telecommunications network site,
rent cost associated with the network performance improvement solution,
backhaul availability,
or any combination thereof.

19. The method of claim 16 further comprising:
automatically identifying the at least one key performance indicator from a set of performance indicators based on a correlation of each performance indicator with customer experience.

20. The method of claim 16, wherein the set of network performance improvement solutions comprises:
cell split,
small cell deployment,
spectrum addition,
spectrum removal,
sector addition,
sector removal, or
any combination thereof.

* * * * *